United States Patent

Mukai

[11] Patent Number: 5,825,508
[45] Date of Patent: Oct. 20, 1998

[54] IMAGE DATA RECEIVING METHOD FOR RECEIVING RETRANSIMITTED IMAGE DATA FRAMES

[75] Inventor: Hirokazu Mukai, Tokyo, Japan

[73] Assignee: NEC Corporaiton, Tokyo, Japan

[21] Appl. No.: 700,093

[22] Filed: Aug. 20, 1996

[30] Foreign Application Priority Data

Aug. 21, 1995 [JP] Japan ................................. 7-211591

[51] Int. Cl.⁶ .................................................. H04N 1/32
[52] U.S. Cl. ............................ 358/412; 358/434; 371/55
[58] Field of Search ................................. 358/434–436, 358/438–439, 442, 468, 412; 379/93.08, 93.33; 371/32, 37.7, 5.5; H04N 1/32

[56] References Cited

U.S. PATENT DOCUMENTS

| | | | |
|---|---|---|---|
| 5,105,423 | 4/1992 | Tanaka et al. | 358/439 |
| 5,159,465 | 10/1992 | Maemura et al. | 358/434 |
| 5,617,220 | 4/1997 | Ueno | 358/434 |

FOREIGN PATENT DOCUMENTS 1-295564  11/1989  Japan .

*Primary Examiner*—Kim Yen Vu
*Attorney, Agent, or Firm*—Sughrue, Mion, Zinn, Macpeak & Seas, PLLC

[57] ABSTRACT

In an image transmission apparatus, image data frames are sequentially received from the source terminal through a connection line at a first transmission rate while checking whether an error occurs in each of the image data frames. When the error occurs in consecutive image data frames whose run length is not smaller than a predetermined value, the transmission rate is changed to a second transmission rate which is smaller than the first transmission rate based on the run length of the consecutive image data frames and the predetermined value. At the second transmission rate, image data frames in which the error occurred are sequentially received from the source terminal through the connection line.

10 Claims, 6 Drawing Sheets

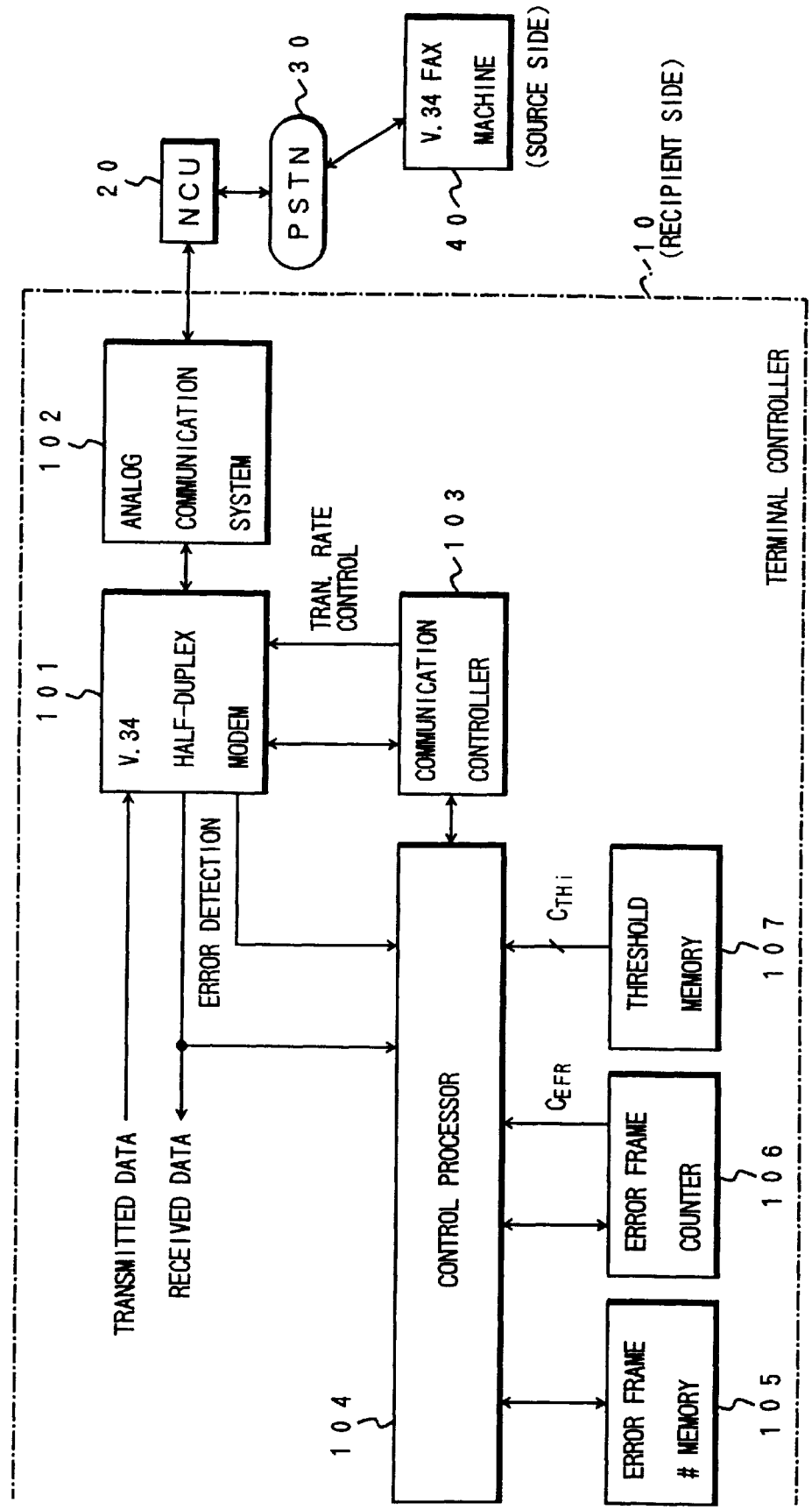

IMAGE DATA RECEIVING METHOD FOR RECEIVING RETRANSIMITTED IMAGE DATA FRAMES

BACKGROUND OF THE INVENTION

1. Field of the invention

The present invention generally relates to image communication systems, and in particular to an image data receiving method for receiving retransmitted image data frames which was erroneously received.

2. Description of the Related Art

In facsimile (fax) communications, there has been known an error correction mode (ECM) function of doing the retransmission of a frame which failed to be successfully transmitted due to some error such as the impairment of a telephone line. More specifically, according to the ITU-T (former CCITT) recommendations, after a frame fails to be transmitted four times, the transmission rate is reduced and then the retransmission of the frame will be tried again. Since the ECM function provides the improved reliability of fax communications, several improved fax-transmission methods using the ECM function have been proposed.

FIGS. 1A and 1B show a first conventional fax-transmission method using the ECM function as disclosed in Japanese Patent Unexamined Publication No. 1-295564. Referring to these figures, after transmitting one data block comprising a sequence of a synchronization flag F, N frames of image data $FR_1$-$FR_N$, and an RCP signal (step S11), the source terminal further transmits a PPS signal indicating the number of frames (N) of the transmitted image data (step S12).

Receiving the PPS signal from the source terminal, the recipient terminal checks the transmission error in frames. When an error frame is detected, the location of the error frame in the N frames of image data is sent back to the source terminal by a PPR (partial page request) signal.

When the PPR signal is not received (NO in step S13), a predetermined normal procedure including message confirmation is performed (step S14). on the other hand, when receiving the PPR signal indicating the error frame (YES in step S13), it is checked whether the PPR signal has been received four times (step S15). When the number of times the PPR signal was received does not reach four (NO in step S15), it is further checked whether the image has been just transmitted (step S16).

If the image has been just transmitted, that is, the PPR signal was received for the first time (YES in step S16), an error rate E is calculated using the number of transmitted frames (N) and the number of error frames indicated by the PPR signal (step S17). When the error rate E is not greater than a predetermined rate Es (NO in step S18), which means that the telephone connection line in use is not impaired, the normal retransmission of the frames which failed to be transmitted is performed at the same transmission rate as usual (step S19).

When the error rate E is greater than a predetermined rate Es (NO in step S18) or when the image has been transmitted (NO in step S16), which means that the telephone connection line in use is impaired, an empty data block containing no image data but the flag F and the RPC signal is transmitted to the recipient terminal (step S20). The steps S15–S20 are repeatedly performed until the number of times the PPR signal was received reaches four. Since the empty data block is transmitted three times, the time interval from when the first PPR signal is received to when the fourth PPR signal is received is shortened.

When the fourth PPR signal is received (YES in step S15), the source terminal transmits a CTC (continue to correct) signal to the recipient terminal and waits for receiving a CTR (response for continue to correct) signal as a response to the CTC signal from the recipient terminal. When the CTR signal is received, the source terminal steps down the transmission rate (step S21), and then, at the reduced transmission rate, the retransmission of the frames which failed to be successfully transmitted is performed (step 522). If the PPR signal is not received after the retransmission (NO in step S13), the frames which failed to be transmitted are successfully transmitted to the recipient terminal this time. In other words, all the N frames of image data to be transmitted are successfully transferred to the recipient terminal over the telephone line. After the transmission of the data block is completed, the source terminal starts transmitting the subsequent data block according to the same steps as mentioned above.

A second conventional fax-transmission method using the ECM function has been also disclosed in the above publication (Japanese Patent Unexamined Publication No. 1-295564). In this method, both the source terminal and the recipient terminal calculate the error rate E using the number of transmitted frames (N) and the number of error frames indicated by the PPR signal. When the error rate E is greater than a predetermined rate Es, the transmission rate is promptly reduced without transmitting empty data blocks and the CTC signal.

However, according to the first method, it is necessary to transmit the empty data block three times until the retransmission is started. Therefore, the first method is a time-wasting sequence. On the other hand, according to the second method, it is necessary to provide both the source and recipient terminals with the error rate calculation function. Therefore, it is almost impossible to achieve the rapid fax-transmission with reliability unless the same type of fax machines are provided in the both side terminals.

Recently a V.34 half-duplex mode communication with a maximum data rate of 33.6 Kbps has been proposed. If a fax machine is provided with a V.34 half-duplex fax modem, a high-speed fax-transmission will be achieved. However, there is no recommendation regarding the transmission rate change timing in the V.34 half-duplex mode communication. Although the rate change timing may be determined arbitrarily, it is undesirable to employ the first rate reduction sequence as shown in FIGS. 1A and 1B in the V.34 half-duplex mode communication because such a sequence cannot take full advantage of the V.34 half-duplex mode communication. It is also undesirable to employ the second sequence as mentioned above because the rapid fax-transmission cannot be achieved actually unless the same type of fax machines are provided in the both side terminals.

SUMMARY OF THE INVENTION

An object of the present invention is to provide a transmission rate change method which enables rapidly changing the transmission rate in response to the impairment of a transmission line.

Another object of the present invention is to provide an image data retransmission method which enables re-transmitting data with reliability.

Still another object of the present invention is to provide a fax apparatus which enables transmitting fax images at high speeds and with reliability.

According to the present invention, the transmission rate is changed to a lower rate based on the run length of consecutive error image data frames. In other words, the impairment of the connection line may be detected by monitoring the run length of consecutive error image data frames.

According to an aspect of the present invention, image data frames are sequentially received from the source terminal through a connection line at a first transmission rate while checking whether an error occurs in each of the image data frames. When an error occurs in each of the image data frames, it further checks whether the error occurs in consecutive image data frames whose run length is not smaller than a predetermined value. If the error occurs in consecutive image data frames whose run length is not smaller than the predetermined value, then a second transmission rate which is smaller than the first transmission rate is determined based on the run length of the consecutive image data frames and the predetermined value. At the second transmission rate, image data frames in which the error occurred are sequentially received from the source terminal through the connection line when the error occurs in consecutive image data frames whose run length is not smaller than the predetermined value.

Preferably, the second transmission rate is lowered in steps as the run length of the consecutive image data frames is increased. More specifically, the second transmission rate is determined by comparing the number of the consecutive image data frames to a plurality of predetermined different values among which the predetermined value is smallest.

According to another aspect of the present invention, it is checked whether the error occurs in consecutive image data frames and then an impairment level of the connection line is determined by comparing a number of the consecutive image data frames to at least one predetermined value. According to the impairment level of the connection line, a second transmission rate which is smaller than the first transmission rate is determined. At the second transmission rate, image data frames in which the error occurred are sequentially received from the source terminal through the connection line.

Preferably, preparing a plurality of predetermined values at predetermined intervals, the number of the consecutive image data frames is compared to a lowest predetermined value of the predetermined values. The impairment level of the connection line is determined by comparing the number of the consecutive image data frames to the predetermined values other than the lowest predetermined value.

Further preferably, the image data frames are a fax image which is received from the source terminal according to V.34 half-duplex specification.

BRIEF DESCRIPTION OF THE DRAWINGS

FIG. 2 is a block diagram showing the functional configuration of an embodiment of a V.34 half-duplex fax apparatus according to the present invention;

DETAILED DESCRIPTION OF THE PREFERRED EMBODIMENTS

Figure 1A:
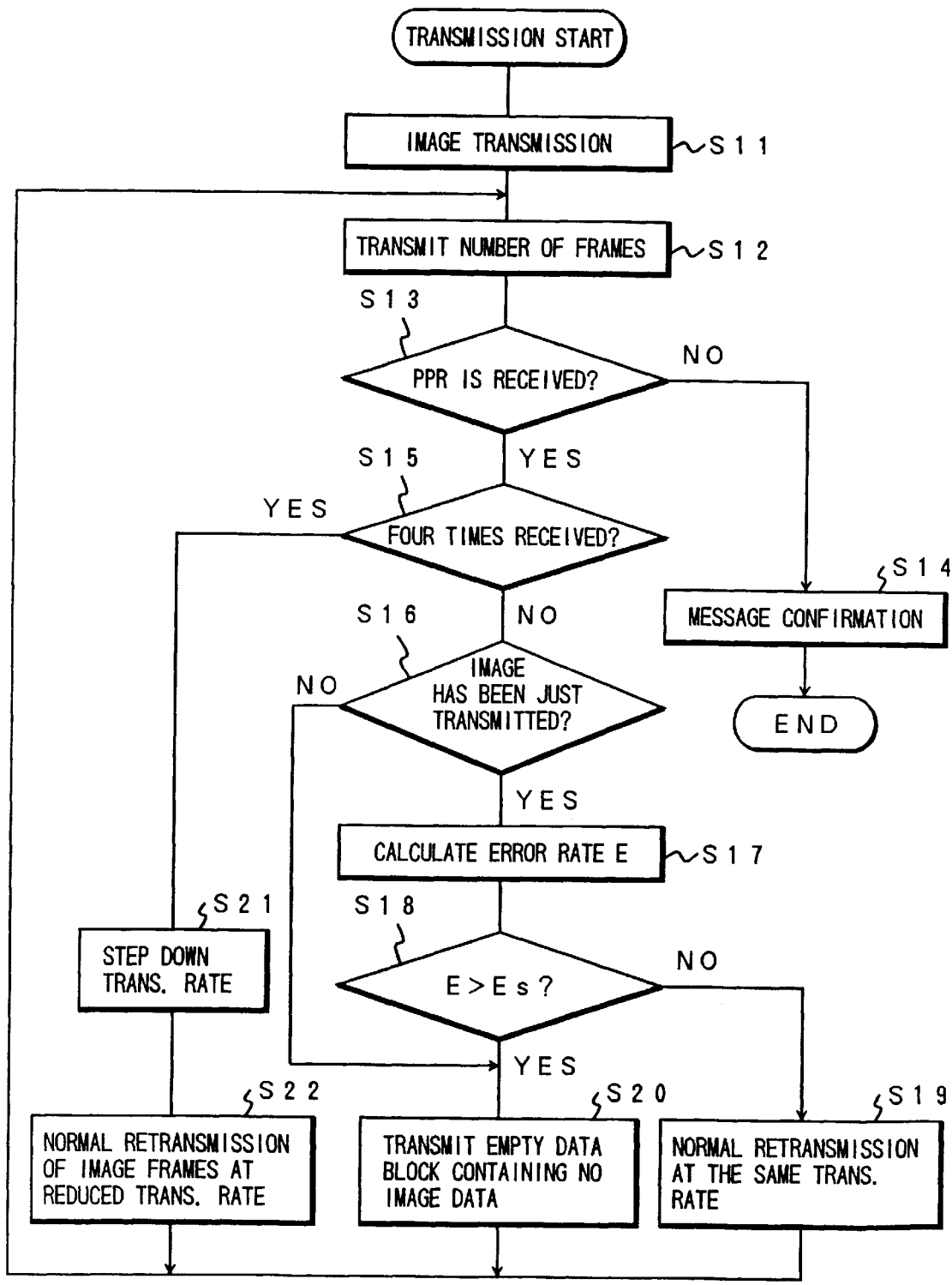
FIG. 1A is a flow chart showing a conventional fax-image retransmission method.
Figure 1B:
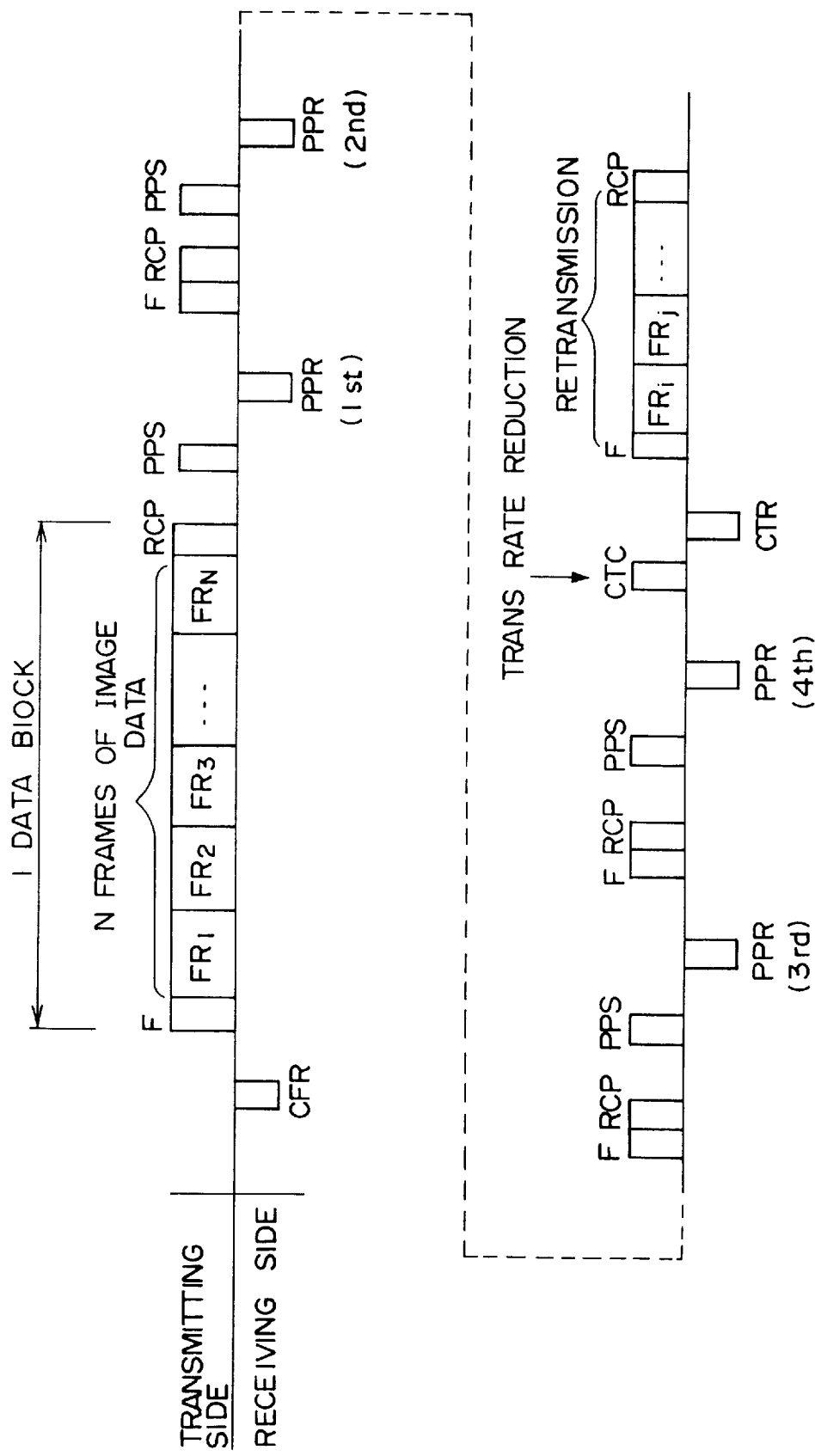
FIG. 1B is a time chart showing the conventional fax-image retransmission method as shown in FIG. 1A.

Referring to FIG. 2, a V.34 half-duplex fax terminal is provided with a terminal controller 10 which performs the whole operation control of the V.34 half-duplex fax communication including the ECM function. The V.34 half-duplex fax terminal is connected to a network control unit (NCU) 20 which is further connected to a public switched telephone network (PSTN) 30.

The terminal controller 10 is comprised of a V.34 half-duplex fax modem 101 which is connected to the NCU 20 through an analog communication system 102 for level adjustment and hybrid formation of transmitted signals and received signals. The V.34 half-duplex fax modem 101 provides the exchange of information with the other fax terminal 40 conforming to a HDLC (high-level data link control) protocol which is a bit-oriented protocol suitable for many different operational modes. More specifically, received data is checked in image data frames whether a CRC (cyclic redundancy check) error occurs in each image data frame. Further, the transmission data rate can be changed to a data rate which is determined by exchanging predetermined signals with the other fax terminal 40 as described in detail later.

The terminal controller 10 is further comprised of a communication controller 103 and a control processor 104. The communication controller 103 controls the V.34 half-duplex fax modem 101 so as to perform various functions including the ECM function. For example, image data is received and transmitted in a primary channel sequence, control signals are exchanged in a control channel sequence, and further the rate of transmitted and received image data is controlled.

The control processor 104 receives image data in frames and an error detection signal for each image data frame from the V.34 half-duplex fax modem 101. Each time an error frame is detected, the control processor 104 stores the location of its error frame in N frames of image data as an error frame number onto an error frame number memory 105 and increments an error frame counter 106 by one. More specifically, in the case where N frames of image data are received from the fax terminal 40, N flags are previously stored onto the error frame number memory 105 and, each time an error frame is detected, the flag at the location of an error frame is set. A threshold memory 107 stores at least one predetermined value $C_{THi}$ which is used as a threshold to control the transmission rate. As described in detail later, when error image data frames are consecutively detected and the error frame counter 106 reaches the predetermined value $C_{THi}$, which means that the telephone connection line of the PSTN 30 is impaired, the control processor 104 instructs the communication controller 103 to reduce the transmission rate in the control channel sequence between image data pages so that the image data transmission is performed with reliability over the impaired telephone line.

FIRST EMBODIMENT

A first embodiment of the transmission rate change method will be described in detail referring to FIG. 3. Hereinafter, it is assumed that the V.34 half-duplex fax terminal receives fax images from the other V.34 half-duplex fax terminal 40 through the PSTN 30.

Figure 3:
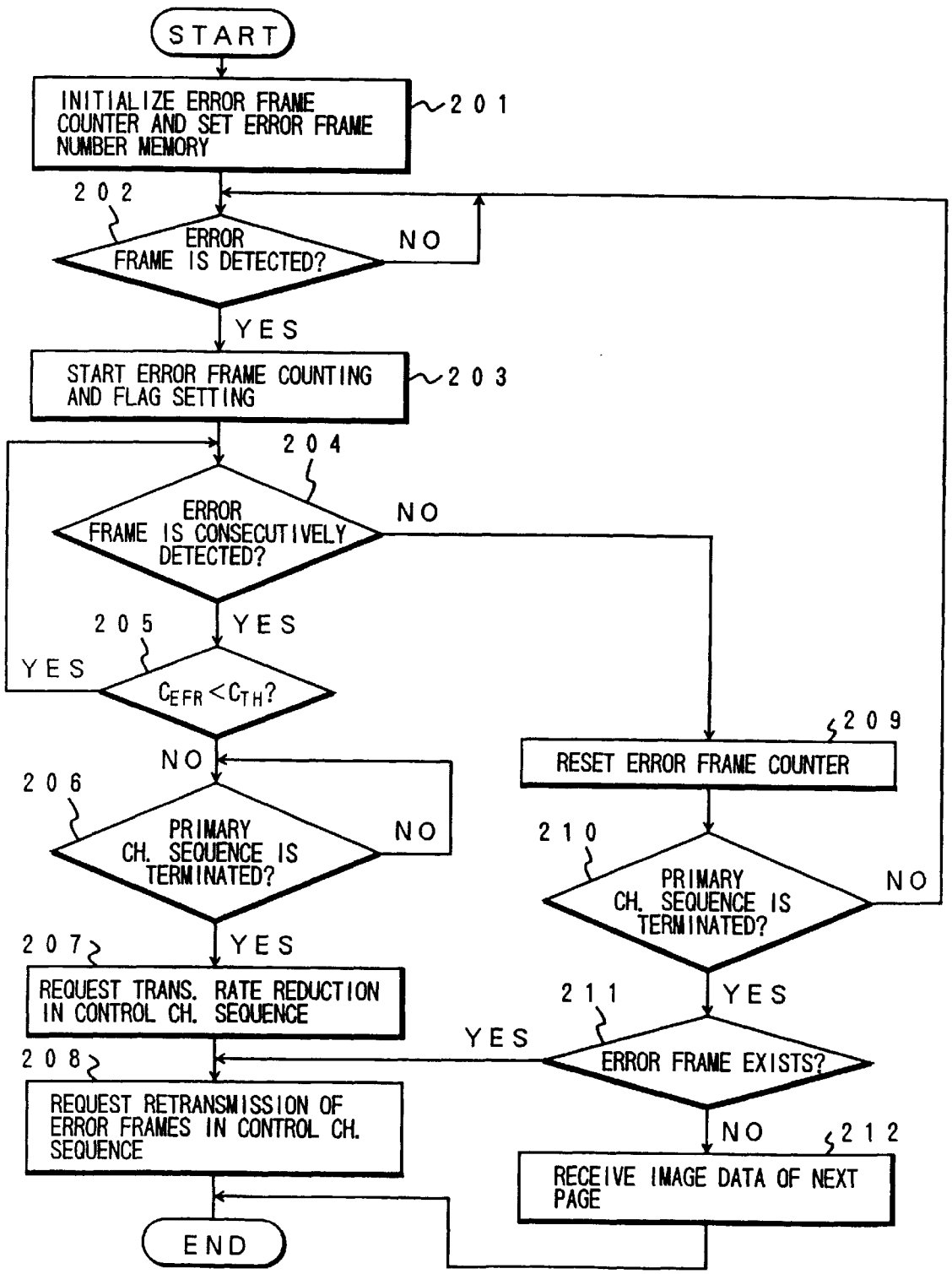
FIG. 3 is a flow chart showing a first embodiment of a transmission rate change and data retransmission sequence according to the present invention.

Referring to FIG. 3, when starting data reception in a primary channel sequence including one page image data, that is, N frames of image data ($FR_1$-$FR_N$), the control processor 104 initializes the error frame number memory 105 and sets the error frame counter 106 to an initial state (step 201), and then checks whether an error image data frame is detected by the V.34 half-duplex fax modem 101 (step 202). If no error frame is detected, the primary channel sequence proceeds until a page of image data is completely received.

When an image data frame $FR_i$ is erroneously received (YES in step 202), the control processor 104 starts incrementing the error frame counter 106 and setting the corresponding flag in the error frame number memory 105 (step 203). As mentioned before, the error frame counter 106 is incremented and the corresponding flag is set in the error frame number memory 105 each time an image data frame is erroneously received. Therefore, each time an image data frame is erroneously received, the control processor 104, referring to the error frame number memory 105, checks whether flags are consecutively set (step 204). If two or more flags are consecutively set, which means that the error image data frames $FR_i$, $FR_{i+1}$, . . . are consecutively detected (YES in step 204), then it is further checked whether the count value $C_{EFR}$ of the error frame counter 106 reaches the predetermined value $C_{THi}$ (step 205). When the count value $C_{EFR}$ is smaller than the predetermined value $C_{THi}$ (YES in step 205), the control processor 104 continues to check whether flags are consecutively set each time an image data frame is erroneously received (step 204).

If flags are consecutively set in the error frame number memory 105 and the count value $C_{EFR}$ of the error frame counter 106 is not smaller than the predetermined value $C_{THi}$ (YES in step 204 and NO in step 205), then the control processor 104 instructs the communication controller 103 to reduce the transmission rate in order to ensure the fax-transmission over the impaired telephone line. After the primary channel sequence is terminated (YES in step 206), the communication controller 103 requests the transmission reduction in a control channel sequence following the primary channel sequence (step 207). After a reduced transmission rate is determined, the retransmission of the error image data frames is requested in the control channel sequence (step 208). At the reduced transmission rate, the retransmission and the subsequent fax-transmission are performed, resulting in reliable fax-transmission. The steps 207 and 208 will be described in detail referring to FIG. 4.

When flags stored in the error frame number memory 105 are not consecutively set (NO in step 204), the control processor 104 resets the error frame counter 106 (step 209) and performs the steps 202–204, 209 and 210 until the primary channel sequence is terminated. When the primary channel sequence is terminated (YES in step 210), it is checked whether an error image data frame exists by referring to the error frame number memory 105 (step 211). when no error frame, a PPS-MPS signal is received from the source fax terminal 40 in the control channel sequence and then the communication controller 103 controls the V.34 half-duplex fax modem 101 such that a MCF signal is sent back to the source terminal 40 in the control channel sequence so as to perform fax-transmission of the next page (step 212). On the other hand, when at least one error frame exists (YES in step 211), the retransmission of the error frame is requested in the control channel sequence (step 208).

Figure 4:
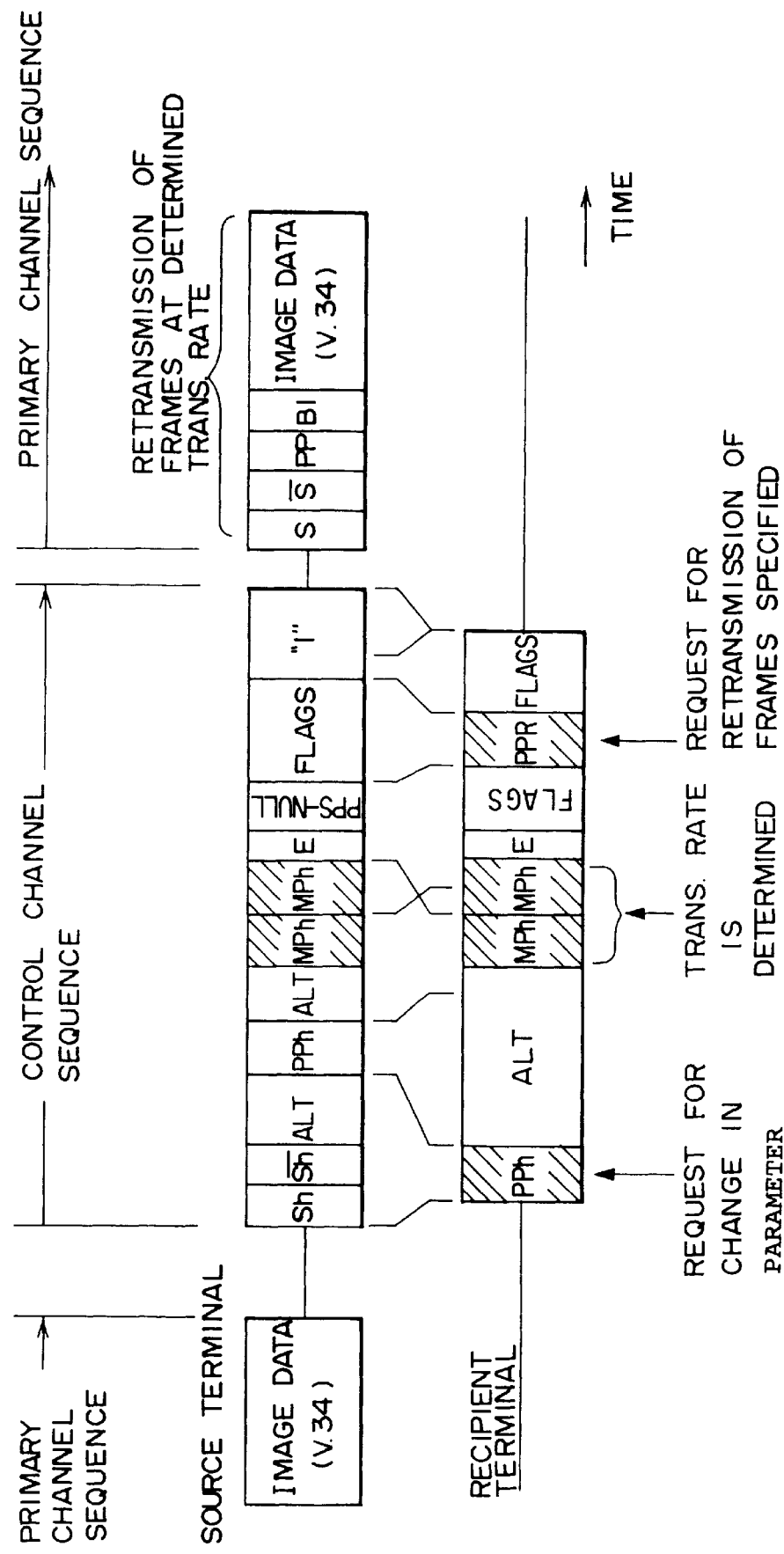
FIG. 4 is a time chart showing an example of the transmission rate change and data retransmission sequence as shown in FIG. 3.

Referring to FIG. 4, the transmission rate change and the retransmission of error image data frames (steps 207 and 208 in FIG. 3) are performed in the control channel sequence between the preceding and subsequent primary channel sequences. More specifically, in the control channel sequence following the primary channel sequence, the recipient terminal sends a PPh signal which, in this case, requests the transmission rate change to the source terminal 40, and then performs the exchange of MPh signals with the source terminal 40 to determine a reduced transmission rate. After the reduced transmission rate is determined, the recipient terminal sends a PPR signal for requesting the retransmission of the error image data frames. As described before, the PPR signal includes the respective locations of the error image data frames which are indicated by the set flags stored in the error frame number memory 105. In this manner, the retransmission and the subsequent fax-transmission are performed at the reduced transmission rate.

SECOND EMBODIMENT

A second embodiment of the transmission rate change method will be described in detail referring to FIG. 5. According to this embodiment, the transmission rate reduction is performed in predetermined steps according to a plurality of predetermined values $C_{TH1}$, $C_{TH2}$ and $C_{TH3}$ ($C_{TH1} < C_{TH2} < C_{TH3}$) which are previously stored in the threshold memory 107.

Figure 5:
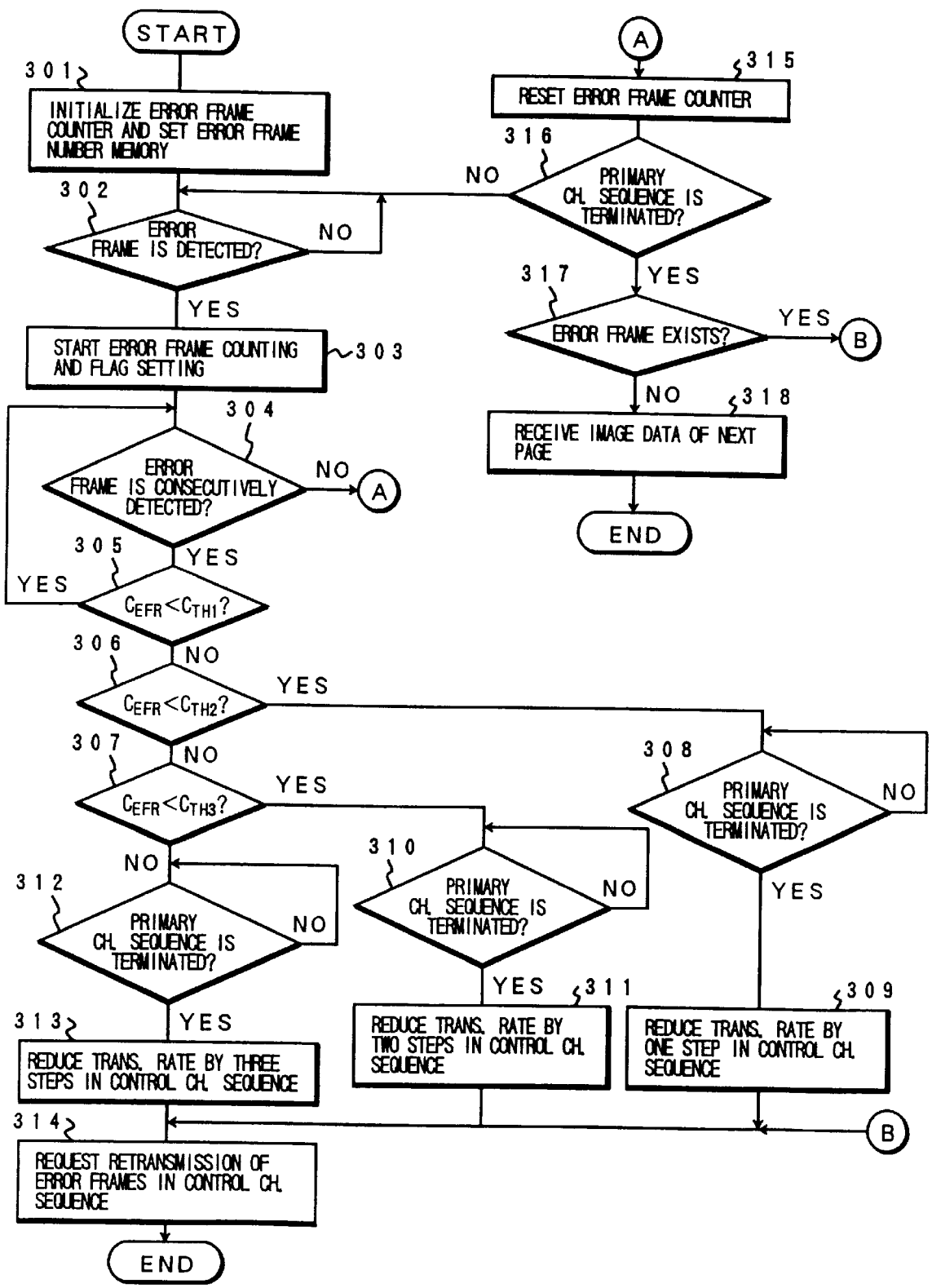
FIG. 5 is a flow chart showing a second embodiment of a transmission rate change and data retransmission sequence according to the present invention.

Referring to FIG. 5, when starting data reception in a primary channel sequence including one page image data, that is, N frames of image data ($FR_1$-$FR_N$), the control processor 104 initializes the error frame number memory 105 and the error frame counter 106 (step 301), and then checks whether an error image data frame is detected by the V.34 half-duplex fax modem 101 (step 302). If no error frame is detected, the primary channel sequence proceeds until a page of image data is completely received.

When an image data frame $FR_i$ is erroneously received (YES in step 302), the control processor 104 starts incrementing the error frame counter 106 and setting the corresponding flag in the error frame number memory 105 (step 303). As mentioned before, the error frame counter 106 is incremented and the corresponding flag is set in the error frame number memory 105 each time an image data frame is erroneously received. Therefore, each time an image data frame is erroneously received, the control processor 104, referring to the error frame number memory 105, checks whether flags are consecutively set (step 304). If two or more flags are consecutively set, which means that the error image data frames $FR_i$, $FR_{i+1}$, . . . are consecutively detected (YES in step 304), then it is further checked whether the count value $C_{EFR}$ of the error frame counter 106 reaches the first predetermined value $C_{TH1}$ (step 305). When the count value $C_{EFR}$ smaller than the first predetermined value $C_{TH1}$ (YES in step 305), the control processor 104 continues to check whether flags are consecutively set each time an image data frame is erroneously received (step 304).

If flags are consecutively set in the error frame number memory 105 and the count value $C_{EFR}$ of the error frame counter 106 is not smaller than the first predetermined value $C_{TH1}$ (YES in step 304 and NO in step 305), then the control processor 104 checks whether the count value $C_{EFR}$ is smaller than the second predetermined value $C_{TH2}$ (step 306). Further, when the count value $C_{EFR}$ is not smaller than the second predetermined value $C_{TH2}$ (NO in step 306), the control processor 104 further checks whether the count value $C_{EFR}$ is smaller than the third predetermined value $C_{TH3}$ (step 307).

When the count value $C_{EFR}$ is greater than the first predetermined value $C_{TH1}$ but smaller than the second predetermined value $C_{TH2}$ (YES in step 306), the control processor 104 instructs the communication controller 103 to reduce the transmission rate by one step in order to ensure the fax-transmission over the impaired telephone line. After the primary channel sequence is terminated (YES in step 308), the communication controller 103 requests one-step reduction in transmission rate in a control channel sequence subsequent to the primary channel sequence (step 309).

When the count value $C_{EFR}$ is greater than the second predetermined value $C_{TH2}$ but smaller than the third predetermined value $C_{TH3}$ (YES in step 307), the control processor 104 instructs the communication controller 103 to reduce the transmission rate by two steps in order to ensure the fax-transmission over the more impaired telephone line. After the primary channel sequence is terminated (YES in step 310), the communication controller 103 requests two-step reduction in transmission rate in the control channel sequence subsequent to the primary channel sequence (step 311).

When the count value $C_{EFR}$ is not smaller than the third predetermined value $C_{TH3}$ (NO in step 307), the control processor 104 instructs the communication controller 103 to reduce the transmission rate by three steps in order to ensure the fax-transmission over the further more impaired telephone line. After the primary channel sequence is terminated (YES in step 312), the communication controller 103 requests three-step reduction in transmission rate in the control channel sequence subsequent to the primary channel sequence (step 313).

After a reduced transmission rate is determined, the retransmission of the error image data frames is requested in the control channel sequence (step 314). At the reduced transmission rate, the retransmission and the subsequent fax-transmission are performed, resulting in reliable fax-transmission. The steps 309, 311, 313, and 314 are performed as shown in FIG. 4.

When flags stored in the error frame number memory 105 are not consecutively set (NO in step 304), the control processor 104 resets the error frame counter 106 (step 315) and performs the steps 302–404, 315 and 316 until the primary channel sequence is terminated. When the primary channel sequence is terminated (YES in step 316), it is checked whether an error image data frame exists by referring to the error frame number memory 105 (step 317). When no error frame, a PPS-MPS signal is received from the source fax terminal 40 in the control channel sequence and then the communication controller 103 controls the V.34 half-duplex fax modem 101 such that a MCF signal is sent back to the source terminal 40 in the control channel sequence so as to perform fax-transmission of the next page (step 318). On the other hand, when at least one error frame exists (YES in step 317), the retransmission of the error frame is requested in the control channel sequence without reduction in transmission rate (step 314).

What is claimed is:

1. A method for receiving an image from a source terminal through a connection line, the image comprising a plurality of image data frames, the method comprising the steps of:
    a) sequentially receiving the image data frames from the source terminal at a first transmission rate while checking whether an error occurs in each of the image data frames;
    b) determining whether the error occurs in consecutive image data frames;
    c) determining an impairment level of the connection line by comparing a number of the consecutive image data frames to at least one predetermined value when the error occurs in consecutive image data frames;
    d) determining a second transmission rate which is smaller than the first transmission rate according to the impairment level of the connection line when the error occurs in consecutive image data frames; and
    e) sequentially receiving image data frames in which the error occurred from the source terminal through the connection line at the second transmission rate when the error occurs in consecutive image data frames.

2. The method according to claim 1, wherein the step c) comprises the steps of:
    preparing a plurality of predetermined values at predetermined intervals;
    comparing the number of the consecutive image data frames to a lowest predetermined value of the predetermined values; and
    determining the impairment level of the connection line by comparing the number of the consecutive image data frames to the predetermined values other than the lowest predetermined value.

3. The method according to claim 1, wherein, in the step d), the second transmission rate is lowered as the impairment level is increased.

4. The method according to claim 6, wherein,
    the step d) comprises the steps of:
        requesting a reduction in transmission rate from the source terminal based on the impairment level; and
        determining the second transmission rate, and
    the step e) comprises the steps of:
        requesting retransmission of the image data frames in which the error occurred from the source terminal; and
        sequentially receiving the image data frames in which the error occurred from the source terminal at the second transmission rate.

5. The method according to claim 1, wherein,
    the step b) comprises the steps of:
        storing flags onto a memory, the flags corresponding to the image data frames received from the source terminal, respectively;
        incrementing a counter each time the error occurs in an image data frame received from the source terminal;
        setting a flag corresponding to the image data frame each time the error occurs in the image data frame; and
        determining whether the flag is consecutively set in the memory, and
    the step c) comprises the steps of:
        resetting the counter when the flag is not consecutively set in the memory; and
        comparing the number of the consecutive flags to at least one predetermined value;
        determining the impairment level of the connection line depending on a position of the number of the consecutive flags in relation to the predetermined value by referring to the counter when the flag is consecutively set in the memory.

6. The method according to claim 1, in a facsimile apparatus conforming to V.34 half-duplex modem specification.

7. A facsimile apparatus comprising:
    fax modem means for sequentially receiving image data frames from a source terminal through a connection line at a first transmission rate while checking whether an error occurs in each of the image data frames;
    control means for controlling the fax modem means according to predetermined sequences;
    processing means for determining whether the error occurs in consecutive image data frames, determining an impairment level of the connection line by comparing a number of the consecutive image data frames to at least one predetermined value when the error occurs in consecutive image data frames, determining a second transmission rate which is smaller than the first transmission rate according to the impairment level of the connection line when the error occurs in consecutive image data frames, and controlling the control means such that the fax mode means sequentially receives image data frames in which the error occurred from the source terminal through the connection line at the second transmission rate when the error occurs in consecutive image data frames.

8. The facsimile apparatus according to claim 7, wherein the processing means comprises a memory for storing a plurality of predetermined values at predetermined intervals, wherein the number of the consecutive image data frames is compared to a lowest predetermined value of the predetermined values, and the impairment level of the connection line is determined by comparing the number of the consecutive image data frames to the predetermined values other than the lowest predetermined value.

9. The facsimile apparatus according to claim 7, wherein the second transmission rate is lowered as the number of the consecutive image data frames is increased.

10. The facsimile apparatus according to claim 7, wherein the fax modem means conforms to V.34 half-duplex modem specification.

* * * * *